Patented Apr. 23, 1940

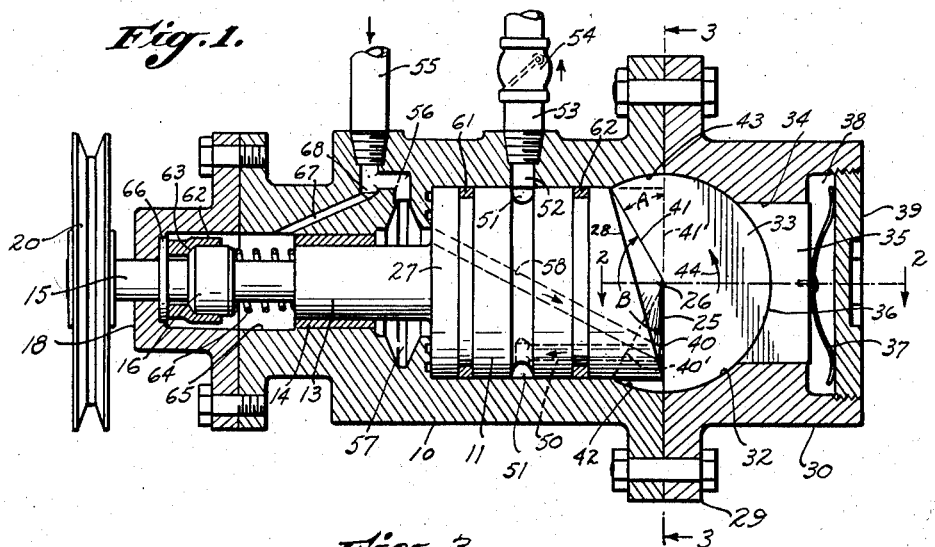
April 23, 1940. D. A. FULTON 2,198,382
ROTARY PUMP
Filed March 30, 1937
INVENTOR.
Donald A. Fulton,
BY Robert W. Fulwider
ATTORNEY.

2,198,382

UNITED STATES PATENT OFFICE 2,198,382

ROTARY PUMP

Donald A. Fulton, Santa Monica, Calif.

Application March 30, 1937, Serial No. 133,864

6 Claims. (Cl. 103—124)

This invention relates to rotary pumps for either liquid or gaseous fluids and particularly for compressing a gaseous or mixed gaseous and liquid refrigerant.

Objects of this invention are to present a rotary pump having a positive displacement, a minimum number of moving parts, producing a uniform rate of flow, and one that will be efficient, dependable and long lived in continuous operation. Other objects and features of the invention will be evident hereinafter.

Fig. 1 is a longitudinal cross-section of the rotary pump. Fig. 2 is a partial longitudinal sectional view of the rotary pump taken at lines 2—2 of Fig. 1. Fig. 3 is an open end view of the pump taken at line 3—3 of Fig. 1. Fig. 4 is a partial longitudinal section of an optional construction of that portion of the rotary pump shown in section in Fig. 1.

Referring to Fig. 1, the pump comprises an enclosure or case 10 containing a cylindrical rotor 11. The rotor makes a substantially fluid-tight fit with the inside cylindrical surface of the enclosure and is rotatably mounted on a main shaft 13 journaled in the bearing 14. An auxiliary shaft 15 extends axially from the main shaft through the rotary seal 65 and out through the end flange 18. A pulley 20 keyed to the end of the shaft 15 serves to rotate the rotor 11 at any desired rate.

The end surface 25 of the rotor 11 opposite the shaft 13 approximates an oblique cone in form, the point of which is coincident at 26 with the rotor axis 27. The base of the cone-shaped surface is outlined by an approximately elliptical line 28 which is generated by the intersection of the said oblique conical and cylindrical rotor surfaces.

The shape and attitude of the conical surface 25 with respect to the axis of the cylindrical rotor is such that all imaginary plane surfaces intersecting one another on the line formed by the axis 27 form in turn by their intersection with the conical surface, straight convergent lines which intersect at equal angles at the point 26. Upon rotation of the rotor 11 the sides of the conical surface due to the obliquity of the cone axis with respect to the rotor axis function in the manner of a cam as described hereinafter.

The end of the enclosure or case adjacent the before-mentioned conical or cam-shaped rotor end surface 25, comprises a flange 29 carrying a cylindrical projection 30. A narrow diametral slot 31 extends longitudinally through the cylindrical end projection 30 and forms at the inner portion thereof a circular recess 32 containing a segmental disc-shaped plate 33 and at the outer end a rectangular-shaped recess 34 containing a bearing plate 35. The inner end 36 of the bearing plate 35 is circular in shape and closes and completes the outer portion of the circular recess 32. The said bearing plate 35 is urged against the edge of the disc 33 by means of the leaf spring 37 which is in turn held under compression in its recess 38 by means of the threaded disc 39.

The disc 33 as stated herebefore is a circular sector bounded by radial edges 40 and 41 intersecting at the point 26 at an angle equal to the before-described angle subtended by the cone surfaces. The edges 40 and 41 thus lie in contact throughout their lengths with the cam-shaped end surface of the rotor 11 and are held in substantially fluid-tight contact therewith by the pressure of the said spring 37 acting through plate 35.

The end portion of the container 10 adjacent the flanged portion 29—30 carries circular recesses 42 and 43 which form a continuation of the inner portion of the circular recess 32 containing the disc 33. The disc 33 is thus free to rotate or rock in an oscillatory manner as indicated by arrows 44 about the point 26 as a center in the said circular recess and it is forced to do so upon the rotation of the rotor 11 by the cam action of the before-described rotor end surface. Thus upon rotation of the rotor 11 the disc 33 is forced to rotationally oscillate about the point 26 as a center through an angle A which is equal to 180° minus the angle B subtended by the cone surface at the peak. The edge 40 of the disc thus moves to the position $40^1$ and the edge 41 moves to the position $41^1$ as illustrated in dotted lines and return for each rotation of the rotor 11 during which time the said radial edges 40 and 41 of the disc 33 always remain in contact with the moving cam-like cone surface. The disc 33 thus divides the pump chamber between the rotor cam end and the flange surface 45 into two closed fluid-tight chambers of variable volume.

During the rotation of the rotor 11 the high portion of the cam surface illustrated by a radial line 46 in Fig. 3 and at line 40 in Fig. 1, moves in substantially fluid-tight contact around the inside face 45 of the flange 29.

Two ports 47 and 48 equidistant on either side of the before-described contact line 46 and spaced a distance from inside edge to inside edge approximately equal to the thickness of the disc 33 constitutes the inlet and outlet respectively to the said two chambers formed between the cam-shaped rotor end 25 and the end flange 29 by the segmental dividing disc 33. The outlet port 47 makes connection through duct 50 with an annular distributor groove 51 cut around the midsection of the rotor. An outlet passage 52 makes connection between the groove 51 and the outlet pipe 53.

The inlet or suction of the rotary pump makes connection with the before-mentioned pump chamber formed between the cam-shaped rotor end and the inside flange face 45 by way of pipe 55 and passage 56 into the annular groove 57 inside of the pump case and thence through the duct 58 and inlet port 48 into the said pump chamber.

The rotor 11 carries two spaced rings 61 and 62 which lie in suitable annular grooves on either side of the outlet passage groove 51. These rings serve to maintain a substantially fluid-tight seal along the rotor surface between the inlet and outlet passages and between the pump chamber and the outlet passage respectively.

The rotary seal contained in the space 65 under the flange 18 and which serves to prevent leakage of fluid either into or out of the rotary pump around the driving shaft 15 comprises a metal thimble 62 having a tapered section 63 into which a pliable rubber ring 16 is thrust by a spring 64 acting under compression. The rubber ring 16 by its deformation under the pressure of the said spring 64 effects a fluid-tight seal between the shaft 15 and the thimble 62 and they rotate together. The thimble makes in turn a fluid-tight sliding or rotary contact with the stationary annular metallic ring 66 set into a recess in the inside of flange 18. Oil is supplied to the space 65 through an oil duct 67 to provide proper lubrication for the sliding surfaces of the sealing mechanism and the bearing 14.

Ordinarily when pumping a gaseous fluid such as in a refrigeration system, the lubricant is mixed in liquid form and circulates constantly with the refrigerant. A trap formed by the offset between the inlet ducts 68 and 56 serves to catch and separate the lubricant from the gaseous stream and to allow it to flow through the duct 67 to the rotary seal mechanism and to the bearing surfaces.

The rotary pump is adapted to be successfully operated by rotation in either direction. It may be preferable, however, when handling fluids under super atmospheric pressure to operate the pump so that the pipe 55 constitutes the inlet or suction to the pump whereby the sealing mechanism in space 65 is at a minimum pressure. For purposes of illustration, therefore, the rotation of the pump rotor is assumed to be clockwise as seen from line 3—3 in Fig. 1 and as shown in Fig. 3 under which condition the pipe 55 will constitute the inlet to the pump and the pipe 53 the outlet.

The operation of the apparatus is as follows: Assuming clockwise rotation of the rotor 11, as viewed in Fig. 3, the port 47 will move with the rotor in a clockwise direction as indicated by the arrow 49 from the position shown towards the upper portion of the segmental disc 33 which forms a fluid-tight seal with the cam-shaped rotor end surface along the edge 41. The before-described high point of the cam-shaped rotor end which makes a moving fluid-tight contact with the inside face 45 of the end flange 29, also moves with the said rotation of the rotor toward the segmental disc 33. Thus, as the rotor moves clockwise from the position shown to a position 180° from that shown, the chamber formed between the cam-shaped end of the rotor and the inside face 45 of the flange 29 and bounded at the ends by the leading edge of the sliding contact line 46 and the movable disc 33 at 41 will contract expelling fluid therefrom out through the port 47, duct 50, groove 51, duct 52, pipe 53, and check valve 54.

At the same time immediately following the passage of the port 48 under the lower contact edge 40 of the disc 33, with the said rotation of the rotor, the chamber formed between the end of the rotor and the inside face 45 of the flange and bounded by the trailing edge of the line of contact 46 and the lower portion of the segmental disc 33 will expand during the same following 180° of rotation drawing fluid into it through inlet pipe 55, duct 56, distributor groove 57, duct 58, and port 48.

The hereinbefore-described pumping cycle is repeated for each 180° of rotation of the rotor 11 resulting in two suction and two pressure impulses per revolution of the rotor. These impulses combine to form a substantially constant flow of fluid through the pump.

The displacement of the pump is a function of the diameter of the rotor and the angle A of the cam surface. The cam angle A may be varied and the rotor diameter modified to obtain any desired displacement.

Fig. 4 illustrates an optional method of maintaining the edges of the disc 33 in fluid-tight contact with the rotor end surface. In this arrangement, the disc is divided into two sectors 70 and 71 each of which is forced against the end surface of the rotor by the U-shaped spring 72 which is retained in position by suitable slots 73 and 74 which receive the spring ends. When the two segments are thus employed the rotor end surface instead of forming a point as at 26 in Fig. 1 is provided with a spherical sector 75 which makes a fluid-tight contact with corresponding spherical segmental surfaces at the inner ends of the circular segments 70 and 71. The circular segments 70 and 71 can thus rotate through an appreciable angle with respect to one another about the center 75 within the circular recess 32 without losing fluid-tight contact with the adjacent working surfaces.

The center of the inside face 45 of the flange 29 also contains recesses-forming portions of a spherical segment there on either side of the slot 32 which completes the spherical socket into which the spherical portion 75 fits and forms a fluid-tight seal during rotation.

The two hereinbefore-described systems of maintaining fluid-tight contact between the disc 33 and the adjacent working surfaces as illustrated in Figs. 1 and 4 may obviously be combined when necessary, but ordinarily the method illustrated in Figs. 1–3 proves satisfactory.

The spring 37, the bearing plate 35, and the rectangular slot 34 in which it is carried as illustrated in said Figs. 1–3 are desirable to provide for compensation for wear between the moving pump and cam surfaces and to maintain them in fluid-tight contact, but these elements may be omitted and the flange 29 and cylindrical portion 30 constructed of a solid piece with only an accurately machined circular recess provided therein to carry the disc 33, without detrimental results to the operation of the apparatus of the invention.

The apparatus of this invention probably finds its most important application in the compression and circulation of volatile liquid refrigerants in connection with the compression system of refrigeration employing such refrigerants as ammonia, sulphur dioxide, carbon dioxide, ethyl chloride and numerous other well-known refrigerants.

The apparatus of this invention, however, is not limited to refrigeration systems but is applicable and advantageous for pumping any fluid, gaseous or liquid, or a mixture of gaseous and liquid fluids.

This invention, therefore, is not to be restricted by the preferred embodiment illustrated herein but is to be limited only by the scope of the following claims.

I claim as my invention:

1. A rotary pump comprising a casing, a rotor in said casing having a cam-shaped end surface, a pair of movable plates having the shapes of circular sectors each bearing along one radial edge upon said cam-shaped surface, means to support said movable plates whereby they are free to rotate within limits, and means between said plates to urge them into contact along said radial edges with said cam-shaped surface, whereby the said radial edges thereof can follow said cam-shaped surface upon rotation of said rotor, said plates together with said cam-shaped surface and walls of said casing defining a chamber of variable volume, means to admit and discharge fluid from said chamber and means to rotate said rotor within said casing.

2. A rotary pump as in claim 1 in which the rotor end is in the shape of an oblique cone.

3. A rotary pump comprising a casing, a rotor in said casing having an oblique cone-shaped end cam surface, said cone-shaped cam surface forming equal angles on all planes intersecting each other along the rotor axis, a movable partition bearing at its edge upon said cam surface and together with said cam surface and walls of said casing defining a chamber of variable volume, means to admit and discharge fluid from said chamber and means to rotate said rotor within said casing.

4. A rotary pump comprising a casing, a rotor in said casing having an oblique cone-shaped end cam surface, said cone-shaped cam surface forming equal angles on all planes intersecting each other along the rotor axis, a movable plate bearing upon said cam surface and together with said cam surface and walls of said casing defining a chamber of variable volume, said plate forming a major circular sector subtending between its radial edges an angle equal to the apex angle of said cam surface, means to admit and discharge fluid from said chamber, and means to rotate said rotor within said casing.

5. A rotary pump comprising a casing, a rotor in said casing having a cam-shaped end surface, a movable partition bearing upon said cam-shaped surface, said partition having the form of a major circular sector and defining with said cam-shaped end surface and with walls of said casing a chamber of variable volume, means to admit and discharge fluid from said chamber and means to rotate said rotor within said casing.

6. A rotary pump comprising a casing having an end wall, a rotor in said casing with its axis of rotation normal to said casing end wall and having an oblique cone-shaped end cam surface, the shape and attitude of said conical surface with respect to the axis of said rotor being such that all imaginary plane surfaces intersecting one another on said axis form by their intersection with said conical surface, straight convergent lines which intersect at equal angles at the apex of said cone, a portion of said cam surface making a moving fluid-tight contact with said end wall at all times, a movable plate bearing at its edge upon said cam surface and together with said cam surface and walls of said casing defining a chamber of variable volume, means to admit and discharge fluid from said chamber and means to rotate said rotor within said casing.

DONALD A. FULTON.